(12) United States Patent
Alidina et al.

(10) Patent No.: US 6,801,995 B1
(45) Date of Patent: *Oct. 5, 2004

(54) METHOD FOR OPTIMALLY ENCODING A SET OF INSTRUCTION CODES FOR A DIGITAL PROCESSOR HAVING A PLURALITY OF INSTRUCTION SELECTABLE RESOURCE TYPES AND AN ASSOCIATED OPTIMIZED SET OF INSTRUCTION CODES

(75) Inventors: Mazhar M. Alidina, Allentown, PA (US); Sivanand Simanapalli, Santa Clara, CA (US); Mark E. Thierbach, South Whitehall Township, PA (US)

(73) Assignee: Agere Systems, Inc., Allentown, PA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 6 days.

(21) Appl. No.: 09/129,116

(22) Filed: Aug. 4, 1998

(51) Int. Cl.$^7$ ................................................ G06F 9/00
(52) U.S. Cl. ...................................... 712/210; 712/220
(58) Field of Search .............................. 712/217, 208, 712/221, 245–248, 210, 220; 395/704

(56) References Cited

U.S. PATENT DOCUMENTS

| | | | | |
|---|---|---|---|---|
| 4,042,914 A | * | 8/1977 | Curley et al. | 710/23 |
| 5,073,855 A | * | 12/1991 | Staplin et al. | 712/217 |
| 5,640,582 A | * | 6/1997 | Hays et al. | 712/38 |
| 5,664,156 A | * | 9/1997 | Wang et al. | 395/500.44 |
| 5,832,273 A | * | 11/1998 | Mizuse | 395/709 |
| 5,881,307 A | * | 3/1999 | Park et al. | 712/23 |
| 5,901,301 A | * | 5/1999 | Matsuo et al. | 712/212 |

OTHER PUBLICATIONS

Intel(iAPX 86/88, 186/188 User's Manual) 1985, Intel 1–41 to 1–34, 1–45, 1–46, 1–48, 1–49.*

Peter Song, "M. Core for the Portable Millennium", 4 pages., MicroDesign Resources, Feb. 16, 1998, Microprocessor Report.

* cited by examiner

Primary Examiner—Gautam R. Patel

(57) ABSTRACT

A method of assigning unique instruction codes to instructions in an instruction set is disclosed. Such an encoded instruction set is also disclosed. Instructions are grouped according to the particular resources used, where all of the instructions in a group have one or more resource types in common. The position of the highest order active bit in the code is used to identify which resource group a particular instruction belongs to. Instructions in a resource group reserve the same number of bits to identify the specific resources to be used, and no more bits are reserved than required. The remaining unassigned bits are used to encode particular command codes. When such an encoded command is decoded, the resource group is identified by determining the highest order active bit in the instruction. This information is used to determine which bits in the instruction are command bits and which are resource-identifying bits. The specific resource information is extracted and used to select the designated resources to be used in executing the command. This encoding scheme eliminates wasted bits in instructions and thereby increases the number of instructions which can be implemented.

15 Claims, 3 Drawing Sheets

METHOD FOR OPTIMALLY ENCODING A SET OF INSTRUCTION CODES FOR A DIGITAL PROCESSOR HAVING A PLURALITY OF INSTRUCTION SELECTABLE RESOURCE TYPES AND AN ASSOCIATED OPTIMIZED SET OF INSTRUCTION CODES

TECHNICAL FIELD

This invention relates to a method of encoding instructions for a processor to realize the maximum number of encoded instructions.

BACKGROUND OF THE INVENTION

One aspect of designing processors, such as digital signal processors, is selection of the particular instructions to be encoded from the entire set of instructions which is supported by the hardware. In a typical selection process, instructions are grouped according to the type of function performed, i.e., multiply accumulates, barrel shifts, etc. For each group, a certain number of instruction bits are set aside to be used to identify the registers affected by the instruction.

For example, in a processor with 16 general purpose registers, four bits are required to identify each register. A particular type of command function that can be executed using either one or two registers will conventionally have eight bits in the instruction op-code reserved to identify the registers. Commands in this group which utilize only a single register use only four of the reserved eight bits. In these commands, the four other bits are unused and are therefore wasted.

SUMMARY OF THE INVENTION

According to the invention, instructions for a computer processor are encoded to minimize the number of wasted bits and maximize the number of encoded instructions. Rather than group instructions according to function, they are arranged in "resource groups" according to the resources used by the instruction. All instructions in a particular resource group therefore require the same number of available bits in order to identify the designated resources, regardless of the particular function performed. In a particular example, the designated resources are the classes and number of registers used by a particular instruction.

In a preferred embodiment, instructions are encoded so that the highest order active bits identify the resource grouping of the instruction. The remaining low order bits are then available to encode a given number of instructions from the specific group. This encoding scheme eliminates wasted bits in instructions and thereby increases the number of instructions which can be implemented.

Increasing the size of the instruction space in this manner allows the formation of an orthogonal instruction set and the definition of special purpose instructions for specific applications. An increase in functionality per instruction also leads to performance improvements. In addition, encoding instructions in this manner can reduce the amount of decoding logic required, because once the resource group for a particular instruction is identified, connections to the specifically identified resources can be established independently of the determination of the specific function of the instruction.

BRIEF DESCRIPTION OF THE DRAWINGS

The foregoing and other features of the present invention will be understood readily from the following detailed description and drawings of illustrative embodiments of the invention in which.

DETAILED DESCRIPTION OF THE PREFERRED EMBODIMENTS

According to the invention, instructions for a computer processor are encoded by grouping them according to the types and number of resources utilized, a particular family of bit patterns with unique characteristics is used to identify each of the groups. For example, each instruction in a particular group reserves the same number of bits for the user to identify the specific resources desired and reserves the same bit field(s) to identify the specific resources. Thus, once the group of an instruction has been determined, the resource selection fields can be extracted and the designated resources accessed without first having to decode the instruction function.

Figure 1:
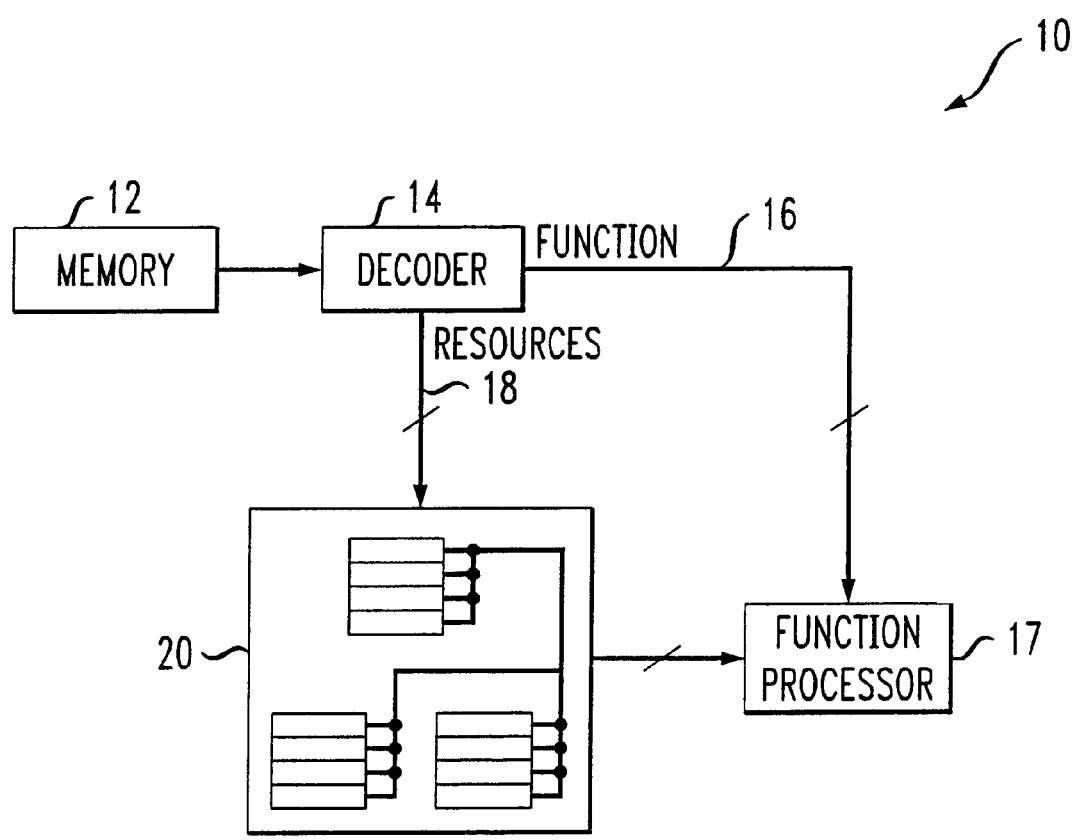
FIG. 1 shows a block diagram of a processor having an instruction set encoded according to the invention.

Turning to FIG. 1, there is shown a processor 10 having a memory 12 in which instructions are stored. The memory 12 is connected to an instruction decoder 14. When the decoder 14 receives an instruction, it decodes the instruction, to determine the instruction group and to extract the encoded function and resource-identifying fields. The function is output as function signal 16 which is connected to a function processor 17, such as an Arithmetic Logic Unit ("ALU"). Control and data signals indicating the identified resource are provided in signal 18, which is used to establish the necessary connections between the specifically designated resources 20, such as registers, and the function processor 17. Because the group designation of the instruction identifies generally which resources are utilized, and therefore which bits in the instruction are resource- identifying bits, the appropriate resource-selecting signals 1 8 can be generated without having to decode the function itself.

An example of instruction encoding according to the invention will now be described with reference to registers as the preferred type of resource. In particular, instructions will be addressed for a processor having several different types and numbers of registers and having a 32-bit instruction field. This complex instruction architecture differs significantly from the instructions for RISC processors, which have small homogenous register sets and simple addressing modes, and where more complex modes are replaced by sequences of simple instructions.

In one preferred processor architecture, the processor includes eight accumulator registers addressed using three bits, four accumulator pairs addressed using two bits, and four auxiliary registers, which may be a different size than the accumulators and which are addressed using two bits. Commands are encoded which use none, one, or more of these resources. In addition, the 32 bit instruction field is divided into two sub-instructions, one being a function statement, and one being a transfer statement.

For this example, 16 bits are allocated to encode the function statement (i.e., the function to be performed and what it operates upon), 15 bits are allocated to encode the transfer statement, and the remaining bit is used to indicate that the instruction is 32 bits long. For simplicity, only the function statement of the instruction set is discussed below. Those skilled in the art will appreciate that the transfer portion may be encoded in a similar manner. It will also be appreciated that this method may be used to encode instructions for processor command sets of varying length and is not limited only to 32-bit instructions with function and transfer elements. It is also noted that instructions may be encoded for resources in addition to registers, such as input/output ports, peripheral devices, or other data or control elements for which identifying bits are reserved within an instruction.

Seven groups of function statement instruction portions which are particularly useful in the context of digital signal processors are discussed herein. The various function statement groups are designated "Fa" through "Fg", according to the resources utilized. Fa instructions do not use any accumulator or other register fields and therefore no bits need be reserved for this purpose. Fb instructions use a single accumulator and so 3 bits of the instruction must be reserved to hold the accumulator address in reserve. Fc instructions involve two accumulator pairs and thus need 4 bits in reserve. Fd instructions involve an accumulator and an accumulator pair and so need 5 reserved bits to identify them. Fe instructions use two independent accumulator fields requiring a total of 6 bits in reserve. Ff instructions use two accumulator fields and an auxiliary register and so need 8 bits. Finally, Fg instructions use three independent accumulators and thus require 9 bits to identify these resources. Other instruction variations are, of course, also possible, according to the specific type of processor, application, and designated resource(s).

Figure 2:
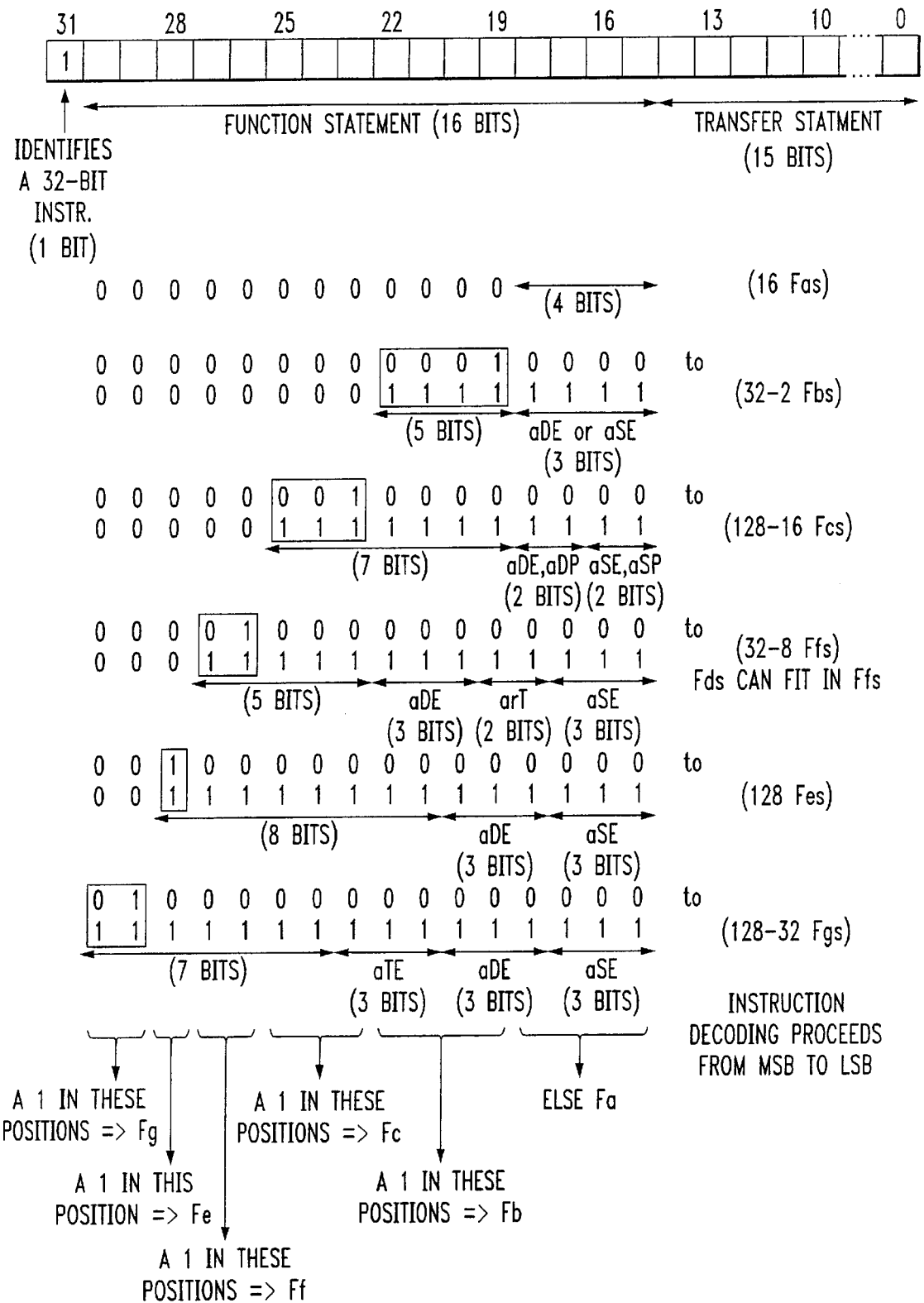
FIG. 2 illustrates one method of encoding instructions according to the invention.

Turning now to FIG. 2, an encoding scheme for these 16-bit function statements Fa–Fg are discussed. For these instructions, the accumulator registers may be either a source register, designated as "aSE" or a destination register, designated as "aDE". Accumulator source and destination pairs are designated as "aSE,aSP" and "aDE,aDP", respectively. Auxiliary registers are identified as "arT."

According to the preferred encoding method, the highest order active bits in an encoded command statement are used to designate the resource group of the encoded instruction statement (e.g., Fa, Fb, etc.). The remaining bits in the instruction are then used to encode various commands for that group. This is done by setting the highest order bits in the instruction group inactive, i.e., all "0", and then using the position of the highest order active bit, i.e., a "1", as a "group identifying" bit which defines the particular encoded group to thereby generate a unique family of bit patterns to identify the instruction groups. More than one leading bit position may be used as a group identifying bit. From an alternative viewpoint, the group designations may be considered as defined by the number of inactive leading bits. The bit-placement and number of the group identifying bits are selected to reserve the correct number of bits needed to identify the resources for the particular group and enough extra bits to encode the desired number of commands in that resource group.

Those of skill in the art will recognize that this "leading edge" bit pattern approach may be varied as needed and that the group encoding bits may be spread throughout the command if desired. A leading or trailing end assignment as described herein may then be "simulated" by reordering the bits as needed.

As shown in FIG. 2, a function statement in which the 12 leading bits are all zero (bits 30–19) is used to identify an Fa instruction which has no selectable resources. The remaining 4 bits are used to encode up to 16 Fa command codes.

Moving to the next highest order bits, a resource group identifying pattern with a "1" in one or more of bit positions 19–22 (or from 8 to 11 leading zeros) identifies Fb group instructions. (This may also be considered 4 separate patterns, each identifying the same resource). The 3 low-order bits are reserved to identify the desired accumulator register and 5 bits are available to encode Fb command codes as between 00010xxx and 11111xxx, where and "x" indicates a reserved resource-identifying bit. (The eight leading zeros have been omitted for clarity). Thus, there are 32 (binary "11111") minus 2 (binary "00010") equals 30 unique command codes using a single accumulator which can be encoded.

Fc commands are identified by a leading 1 in one in bit positions 23, 24, or 25 (i.e., from 5 to 7 leading zeros) and 4 bits must be reserved to identify the two accumulator pairs. Thus, Fc commands may be encoded between "0010000xxxx" and "1111111xxxx". This allows for 128–16=112 Fc commands to be encoded.

Fd and Ff commands are identified by a leading 1 in bit position 26 or 27 (three to four leading zeros) and need 5 or 8 bits reserved, respectively, to identify the two accumulator registers and the auxiliary register. Reserving 8 bits allows for command codes between "01000xxxxxxxx" and "11111xxxxxxxx" to be assigned to Fd and Ff commands, and therefore 32–8=24 command codes for these groups are available for encoding.

An Fe command is identified by a leading 1 in bit position 28 (two leading zeros) and needs 6 bits resource-identifying bits reserved. Fe command codes can be assigned between "10000000xxxxxx" and "11111111xxxxxxxx", providing for 256–128=128 encodable Fe commands.

Finally, an Fg command is identified by a leading 1 in bit positions 29 or 30 (one or no leading zeros) and 9 resource-identifying bits must be reserved. Thus, Fg commands may span between "0100000xxxxxxxxx" and "1111111xxxxxxxxx", and so 128–32=96 Fg commands can be encoded.

Therefore, for this particular function grouping, a total of 406 separate command control codes may be encoded within the 16 bit function statement while reserving anywhere from zero to nine resource-identifying bits within the command. According to the invention, only resource-identifying bits which will be used by a given command are reserved, eliminating wasted bits which reduce the number of encodable commands. By way of comparison, a processor having the same general architecture and a 32-bit instruction code divided into function and transfer statements, but having a command set encoded by function, as opposed to resource, has four function groups of 128, 32, 32, and 32 instructions each, giving a total of 224 instructions. Encoding the commands according to the present invention thus increases the number of encodable commands by over 80%.

Once the command set has been defined, specific commands are encoded (typically by a compiler) by selecting the proper function command and inserting the specifically designated resource identification. For example, a hypothetical Fe function statement may be specifically encoded to use destination register 5 and source register 7. As discussed above and shown in FIG. 2, Fe commands have two leading inactive bits followed by an active bit and have six bits reserved to identify the two register resources aDE (3 bits) and aSE (3 bits). Adding a highest order bit to indicate a 32-bit instruction, the binary representation of the 16-bit function statement portion of this particular command is therefore:

| 32-bit instruction | Fe statement | command code | aDE | aSe |
|---|---|---|---|---|
| 1 | 001 | cccccc | 101 | 111 | where the "cccccc" represents the particular Fe function command code. If the binary code designating the particular function selected by the programmer or compiler is "101011", the resulting encoded 16-bit function statement is "1001101011101111", or "9AEF" in hexadecimal format.

Figure 3:
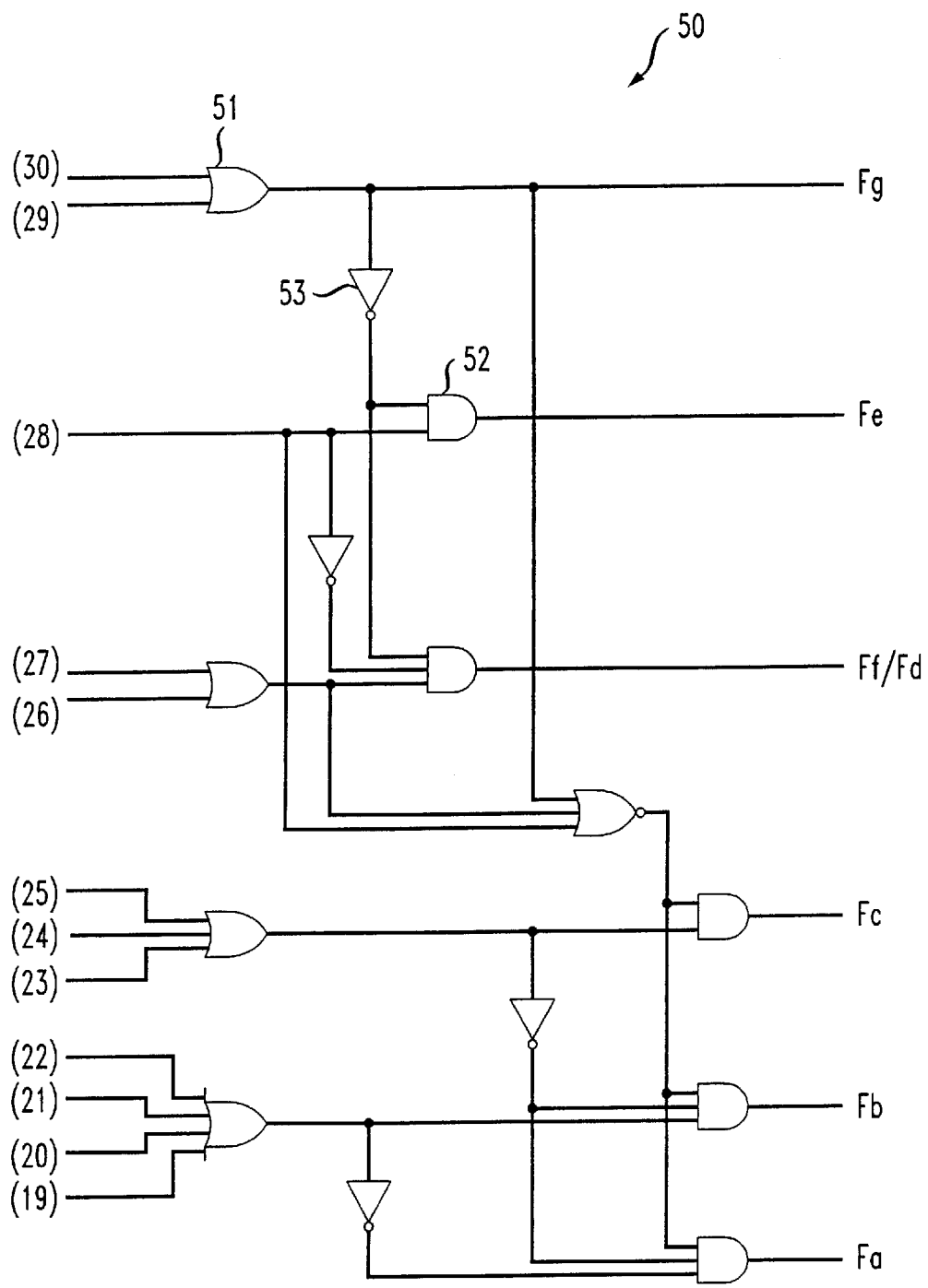
FIG. 3 is a logic diagram of a circuit for decoding instructions encoded according to the invention.

As a further aspect of the invention, instruction commands encoded as disclosed herein may be easily decoded with a minimum of decoding logic using a simple series of logic gates. An implementation of a portion of such a decoder 50, optimized to reduce the number of logic levels, is shown in FIG. 3. Other implementations are, of course, possible, as will be apparent to one of skill in the art.

The operation of the decoder 50 shown in FIG. 3 will be illustrated using the sample encoded instruction discussed above. With reference to FIG. 1, an instruction having a 16-bit function statement "9AEF" is retrieved from memory and presented to the decoder 14. Bits 30 to 19 are separately applied to the logic gates as shown. Bits 30 and 29 are applied to OR gate 51. These bits are both zero and therefore the output, Fg, is low. Bit 28 is applied to AND gate 52. Also applied to gate 52, via inverter 53, is the inverted output of the OR gate 51 (i.e., not-Fg). Bit 28 is high, the Fg output is low, and therefore the Fe output from AND gate 52 is high, indicating that the command is an Fe command.

Once the resource-type of the command is known, the position of the specific resource-selection fields and the command code field is also known. The Fe indication is used by additional logic (not shown) to determine the specified aDE register from bits 20–18 of the command and the specified aSE register from bits 17–15, here five and seven, respectively. The command code value is extracted from bits 27–21. The extracted command code, "101011," is then executed using the designated aDE and aSE registers.

While the invention has been particularly shown and described with reference to preferred embodiments thereof, it will be understood by those skilled in the art that various changes in form and details may be made therein without departing from the spirit and scope of the invention.

We claim:

1. A method for creating a computer executable set of instruction codes embodied in a computer readable medium for operation of a processor having a plurality of instruction selectable resource types, comprising the steps of:

assigning a unique bit pattern to the computer executable set of instruction codes utilizing a predefined group of resources, the group of resources being predefined according to a type and number of utilized resources;

reserving within the instruction codes for each predefined group of resources a subportion of an instruction code to identify specific resources from the respective predefined group of resources; and defining unique, variable length instruction command codes in instructions which are consistent with the assigned unique bit pattern and the reserved subportions such that the number of instructions encoded within a fixed-length bit field is increased and the number of wasted bits in the set of instruction codes is minimized so as to operate the processor with enhanced functionality per instruction;

each instruction code thereby including a resource identifying bit pattern in a particular location within the instruction code, the resource identifying bit pattern identifying a corresponding predefined group of resources used by the instruction code, each predefined group of resources having an associated unique resource identifying bit pattern, each instruction code with the same resource identifying bit pattern-utilizing the same predefined group of resources;

wherein said resource identifying bit patterns comprise a predefined number of consecutive bits in predetermined states; and wherein said resource identifying bit patterns comprise unique sequences of inactive bits of different lengths.

2. The method of claim 1, further comprising the step of selecting said bit patterns, wherein each bit pattern corresponds to a unique number of consecutive bits of a first state in predefined positions.

3. The method of claim 2, where in the step of reserving a subportion comprises the step of reserving a number of bits to identify said specific resources.

4. The method of claim 3, wherein said consecutive bits in predefined positions are high-order bits and said reserved number of bits are consecutive low order-bits, wherein each instruction code has a highest order bit of the first state, the position of which indicates the resource group used by the instruction command code in the respective instruction code.

5. The method of claim 1, wherein the defining step is performed after the assigning and reserving steps.

6. A set of computer executable instruction codes embodied in a computer readable medium for operation of a microprocessor having a plurality of selectable resource types, the microprocessor operating according to the computer executable instruction codes with enhanced functionality per instruction comprising:

a resource identifying bit pattern in a particular location within each instruction code, the resource identifying bit pattern identifying a predefined set of resources used by the instruction code, the set of resources being predefined according to a type and number of utilized resources, each predefined set of resources having an associated unique resource identifying bit pattern, each instruction code with the same resource identifying bit pattern utilizing the same predefined set of resources;

a subportion of the instruction code identifying specific resources from the set; and each instruction code including a variable length instruction command code which is consistent with the resource identifying bit pattern and the subportion such that the number of instructions encoded within a fixed-length bit field is maximized and the number of wasted bits in the set of instruction codes is minimized;

wherein said resource identifying bit patterns, comprise a predefined number of consecutive bits in predetermined states; and wherein said resource identifying bit patterns comprise unique sequences of inactive bits of different lengths.

7. The set of instruction codes of claim 6, wherein said sequences begin at a predefined bit position.

8. The set of instruction codes of claim 7, wherein said subportion comprises a number of bits reserved to identify said specific resources, subportions in different instruction codes with the same bit pattern being in the same position.

9. The set of instruction codes of claim 6, wherein said resource identifying bit patterns have different highest-order active bits, the position of a highest order active bit in an instruction code indicating the resource group used by the instruction command code in the instruction code.

10. A set of computer executable instruction codes embodied in a computer readable medium for operation of a microprocessor having a plurality of selectable resource types, the microprocessor operating according to the computer executable instruction codes with enhanced functionality per instruction, the computer executable instruction codes comprising:

a resource identifying bit pattern in a particular location in each instruction code, the resource identifying bit pattern identifying a predefined set of resources used by the instruction code, the set of resources being predefined according to a type and number of utilized resources, each predefined set of resources having an associated unique resource identifying bit pattern, each instruction code with the same resource identifying bit pattern utilizing the same predefined set of resources, wherein the resource identifying bit patterns comprise a predefined number of consecutive bits in predetermined states, wherein the resource identifying bit patterns comprise unique sequences of inactive bits of different lengths, wherein the sequence begins at a predefined bit position;

a subportion of the instruction code identifying specific resources from the set, wherein the subportion comprises a number of bits reserved to identify the specific resources, subportions in different instruction codes with the same bit pattern being in the same position; and each instruction code including an instruction command code which is consistent with the resource identifying bit pattern, wherein the instruction codes comprise an instruction code portion such that the number of instructions encoded within a fixed-length bit field is maximized and the number of wasted bits in the set of instruction codes is minimized, the set of instruction codes comprising:

a first bit pattern having 12 consecutive inactive high-order bits;

a second bit pattern having from 8 to 11 consecutive inactive high-order bits and 3 reserve bits;

a third bit pattern having from 5 to 7 consecutive inactive high-order bits and 4 reserve bits;

a fourth bit pattern having from 3 to 4 consecutive inactive high-order bits and 8 reserve bits;

a fifth bit pattern having 2 consecutive inactive high-order bits and 6 reserve bits; and a sixth bit pattern having zero or 1 inactive high-order bits and 9 reserve bits.

11. A computer executable instruction code structure embodied in a computer readable medium for operation of a microprocessor having a plurality of selectable resource types and an instruction set including commands to use various sets of resource combinations, the computer executable instruction code structure comprising:

a variable length command code portion indicating a function to be performed by the microprocessor using specific resources selected from a set of resources;

a resource selection portion for identifying the specific resources; and a resource type portion identifying the set of resources used by a particular instruction and a position of the resource selection portion in an instruction code; so that an instruction code having the computer executable instruction code structure can be processed by the microprocessor with enhanced functionality per instruction such that the number of instructions encoded within a fixed-length bit field is maximized and the number of wasted bits in the set of instruction codes is minimized;

wherein each instruction code includes a resource identifying bit pattern in a particular location within the instruction code, the resource identifying bit pattern identifying a predefined set of resources used by the instruction code, the set of resources being predefined according to a type and number of utilized resources, each predefined set of resources having an associated unique resource identifying bit pattern, each instruction code with the same resource identifying bit pattern utilizing the same predefined set of resources;

wherein said resource identifying bit patterns comprise a predefined number of consecutive bits in predetermined states; and wherein said resource identifying bit patterns comprise unique sequences of inactive bits of different lengths.

12. The instruction code structure of claim 11, wherein said resource selection portions comprise unique sequences of consecutive bits.

13. The instruction code structure of claim 12, wherein said resource selection portions have different highest-order active bits, the position of the highest-order active bit indicating the specific resources used by a respective instruction code.

14. The instruction code structure of claim 13, wherein said resource selection portion comprises a high-order bit portion of said code structure and said resource selection portion comprises a low-order bit portion of said code structure.

15. In a processor having eight accumulator registers, four accumulator pairs, and four auxiliary registers, and having an instruction statement including an instruction code field for containing a command code designating a specific microprocessor function performed using various sets of the registers, a set of computer executable instruction codes embodied in a computer readable medium for operation of the processor, the processor operating according to the computer executable instruction codes with enhanced functionality per instruction, such that the number of instructions encoded within a fixed-length bit field is maximized and the number of wasted bits in the set of instruction codes is minimized comprising:

a first set of codes having 12 consecutive inactive high-order bits;

a second set of codes having from 8 to 11 consecutive inactive high-order bits and 3 lower-order bits for identifying an accumulator register;

a third set of codes having from 5 to 7 consecutive inactive high-order bits and 4 lower-order bits for identifying two accumulator pairs;

a fourth set of codes having from 3 to 4 consecutive inactive high-order bits and 8 lower-order bits for identifying two accumulator registers and one auxiliary register;

a fifth set of codes having 2 consecutive inactive high-order bits and 6 lower-order bits for identifying two accumulator registers; and a sixth set of codes having zero or 1 inactive high-order bits and 9 lower-order bits for identifying three accumulator registers.

* * * * *